United States Patent
Diehl et al.

(10) Patent No.: US 8,229,857 B2
(45) Date of Patent: Jul. 24, 2012

(54) SECURE PRE-RECORDED DIGITAL MEDIUM

(75) Inventors: Eric Diehl, Liffre (FR); Alain Durand, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 731 days.

(21) Appl. No.: 11/328,560

(22) Filed: Jan. 10, 2006

(65) Prior Publication Data

US 2006/0178995 A1 Aug. 10, 2006

(30) Foreign Application Priority Data

Jan. 24, 2005 (EP) .................................... 05100406

(51) Int. Cl.
- H04L 9/00 (2006.01)
- H04L 9/08 (2006.01)
- H04L 9/32 (2006.01)
- G06F 21/00 (2006.01)
- G06F 15/16 (2006.01)
- G06F 11/30 (2006.01)
- G06F 12/14 (2006.01)
- G06F 7/04 (2006.01)
- G06F 17/30 (2006.01)
- H04N 7/167 (2006.01)
- H04N 7/16 (2006.01)

(52) U.S. Cl. ................ 705/51; 705/50; 705/57; 705/59; 709/227; 713/169; 713/171; 713/189; 725/31; 726/26; 380/259; 380/277; 380/283

(58) Field of Classification Search ............. 705/50–79; 380/200–203
See application file for complete search history.

(56) References Cited

U.S. PATENT DOCUMENTS

| | | | |
|---|---|---|---|
| 6,615,192 B1 * | 9/2003 | Tagawa et al. .................. 705/57 |
| 7,466,826 B2 * | 12/2008 | Andreaux et al. ............ 380/277 |
| 7,490,249 B1 * | 2/2009 | Djakovic ...................... 713/193 |
| 2003/0226029 A1 * | 12/2003 | Porter et al. ................. 713/200 |
| 2004/0015992 A1 * | 1/2004 | Hasegawa et al. .............. 725/86 |
| 2004/0114759 A1 * | 6/2004 | Yoshimura et al. ........... 380/251 |
| 2004/0260950 A1 * | 12/2004 | Ougi et al. .................... 713/201 |
| 2005/0144470 A1 * | 6/2005 | Takashima et al. ........... 713/189 |
| 2006/0095381 A1 * | 5/2006 | Yokota et al. .................. 705/57 |
| 2007/0124602 A1 * | 5/2007 | Wald et al. .................... 713/193 |

FOREIGN PATENT DOCUMENTS

| | | |
|---|---|---|
| EP | 0 933 770 A1 | 8/1999 |
| JP | 11-250192 | 9/1999 |
| WO | WO 99/38162 | 7/1999 |
| WO | WO 01/43129 A1 | 6/2001 |
| WO | WO 2005/003886 A2 | 1/2005 |

OTHER PUBLICATIONS

Patent Asbtracts of Japan vol. 1999, No. 14 Dec. 22, 1999 (Dec. 2, 1999) & JP 11 250192 A (NTT Data Corp.), Sep. 17, 1999.

* cited by examiner

*Primary Examiner* — Calvin L Hewitt, II
*Assistant Examiner* — Emile Su
(74) *Attorney, Agent, or Firm* — Robert D. Shedd; Paul P. Kiel

(57) ABSTRACT

A secure pre-recorded medium and a method for descrambling encrypted content thereon. When a player wants to access the content, a secure processor on the medium verifies that the player has not been revoked, preferably by comparing an identity of the player with identities in a revocation list, after which a mutual authentication is performed. The secure processor then verifies that the player has the rights to access the content and provides the player with the key necessary to descramble the content, whereafter the player descrambles the content.

4 Claims, 3 Drawing Sheets

SECURE PRE-RECORDED DIGITAL MEDIUM

FIELD OF THE INVENTION

The present invention relates generally to digital recording media, and in particular to security for pre-recorded digital media.

BACKGROUND OF THE INVENTION

The proliferation of digital recording media has enabled many people to enjoy content, such as for example films and music, with, at least in theory, no deterioration of quality over time. Unfortunately, it has also offered possibilities for pirating, since pure digital content may be copied quite easily an unlimited number of times. In order K to counter this, many different solutions as to how to protect digital content have been proposed.

Digital Versatile Disks (DVDs), which make up a great part of the sold media, for example use static storage. To prevent illegal copying, the digital content on DVDs is encoded using the Content Scrambling System (CSS) algorithm. The key used for encoding is dedicated and a corresponding key, used for decoding, is common to every player of a manufacturer.

Players for more recent pre-recorded media, such as the ones protected by the Blu-ray Disc Copy Protection System (BD-CPS) and Content Protection for Pre-recorded Media (CPPM), each have one unique set of keys. Protection is based on broadcast techniques, such as for example the Fiat-Naor scheme.

There have also been attempts to turn a static medium into a dynamic one by adding a processor to the recording medium. Japanese patent application 10-242555 teaches a CD-ROM with an embedded secure processor that communicates with the player. The processor forwards a password to the player, the password allowing decryption of the content. This solution, however, is susceptible to replay attacks.

Another Japanese patent application, 10-050713, discloses a system that uses a recording medium with a built-in IC chip, which holds the decryption key for the content. The IC chip passes the key to the host only upon successful authentication of the host, and adds a counter to limit the number of times the key may be transferred. This solution does not, however, prevent a pirate from creating counterfeit titles. Furthermore, if a pirate manages to build a fake player, he can use techniques that discloses the decoding key.

It can therefore be appreciated that there is a need for a flexible solution that overcomes problems of the prior art and improves the security of pre-recorded digital media. This invention provides such a solution.

SUMMARY OF THE INVENTION

In a first aspect, the invention is directed to a method of descrambling by a player encrypted content on a secure medium that comprises a secure processor. The secure processor verifies that the player has not been revoked and provides the player with the key necessary to descramble the content and the player descrambles the content.

It is preferred that the secure processor verifies that the player has the rights to access the content.

It is advantageous that the content is divided into chapters and that the secure processor verifies that the player has the rights to access the content for each chapter.

It is advantageous that the secure processor has access to a revocation list and that it verifies that the player has not been revoked by comparing an identity of the player with identities in the revocation list.

It is further preferred that the secure processor and the player mutually authenticate one another.

It is further preferred that, in order to provide the player with the necessary key, the player reads an encrypted version of the descrambling key from a content memory on the medium and sends it to the secure processor, which decrypts the key and sends it to the player.

In a second aspect, the invention is directed to a method of descrambling encrypted content on a secure medium comprising a secure processor. A player authenticates the secure processor, receives the key necessary to descramble the content, and descrambles the content.

It is preferred that, in order to receive the key necessary to descramble the content, the player reads an encrypted version of the descrambling key from a content memory on the medium, sends the encrypted descrambling key to the secure processor, and receives from the secure processor the descrambling key.

In a third aspect, the invention is directed to a method of providing to a player encrypted content on a secure medium that comprises a secure processor. The secure processor verifies that the player has not been revoked, authenticates the player, and provides the player with the key necessary to descramble the content.

It is preferred that the secure medium verifies that the player has the rights to access the content.

It is advantageous that the content is divided into chapters and that the secure processor verifies that player has the rights to access the content for each chapter.

It is also preferred that the secure processor has access to a revocation list and that the secure processor verifies that the player has not been revoked by comparing an identity of the player with identities in the revocation list.

It is further preferred that, in order to provide the player with the key necessary to descramble the content, the secure processor receives an encrypted descrambling key from the player, decrypts the encrypted descrambling key, and sends the descrambling key to the player.

It is further preferred that the secure processor encrypts the key before providing it to the player.

In a fourth aspect, the invention is directed to a medium for use by a player. The medium comprises a content memory storing encrypted content and a secure processor, and it stores a revocation list.

It is preferred that the secure processor is adapted to verify that the player has not been revoked.

It is advantageous that the secure processor has access to a revocation list and that it verifies that the player has not been revoked by comparing an identity of the player with identities in the revocation list.

It is also preferred that the secure processor is adapted to authenticate the player.

It is further preferred that the secure processor is adapted to verify that the player has the rights to access the content.

It is advantageous that the content is divided into chapters and that the secure processor verifies that player has the rights to access the content at least once for each chapter.

It is further preferred that the secure processor is adapted to provide the player with the key necessary to descramble the content.

It is advantageous that, in order to provide the player with the key necessary to descramble the content, the secure processor receives an encrypted descrambling key from the player, decrypts the encrypted descrambling key, and sends the descrambling key to the player.

It is further preferred that the secure processor is a radio frequency (RF) chip.

BRIEF DESCRIPTION OF THE DRAWINGS

Preferred features of the present invention will now be described, by way of example, with reference to the accompanying drawings, in which.

PREFERRED EMBODIMENT OF THE INVENTION

Figure 1:
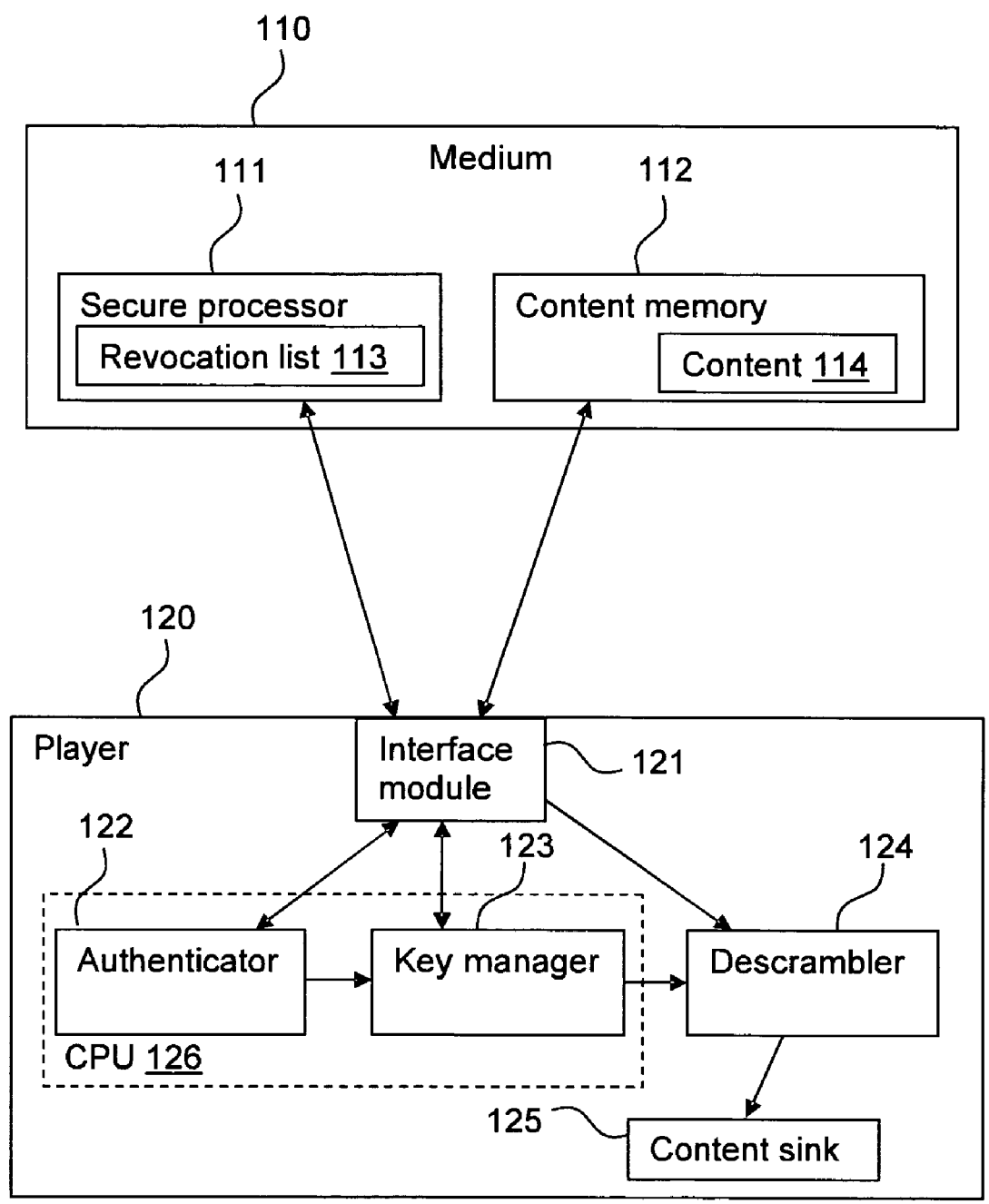
FIG. 1 illustrates the interaction of a secure pre-recorded medium and a corresponding player according to the invention.

FIG. 1 illustrates the interaction of a secure pre-recorded medium 110 and a corresponding player 120 according to the invention.

The medium 110 stores encrypted content 114 in a content memory 112 that is freely accessible by the player 120. Information, such as decryption keys, needed to decrypt the content 114 is stored in a secure processor 111. A person skilled in the art will appreciate that the secure processor 111 may have inherent storage capacities (not shown), but that it may also use the medium storage capacities, such as the content memory 112, and secure that storage using a key internal to the secure processor.

The player 120 comprises an interface module 121 that handles communication with both the secure processor 111 and the content memory 112 of the medium 110, i.e. it is capable of reading content 114 from the content memory 112 and of communicating with the secure processor 111. The interface module may be capable of optical interaction, radio interaction, or both optical and radio interaction, for example to interact optically with the content memory 112 and by radio with the secure processor 111. The player 120 further comprises an authenticator 122, a key manager 123, and a descrambler 124, all of which will be further described hereinafter. In a particularly preferred embodiment, the authenticator 122 and the key manager 123 are comprised in a central processing unit (CPU) 126, and the descrambler 124 is an Advanced Encryption Standard (AES) descrambler chip. The interface module 121 is also capable of communication with these three units 122, 123, 124. The player 120 may also comprise a content sink 125 that, even though it is not part of the invention as such, will be briefly discussed hereinafter.

Figure 2:
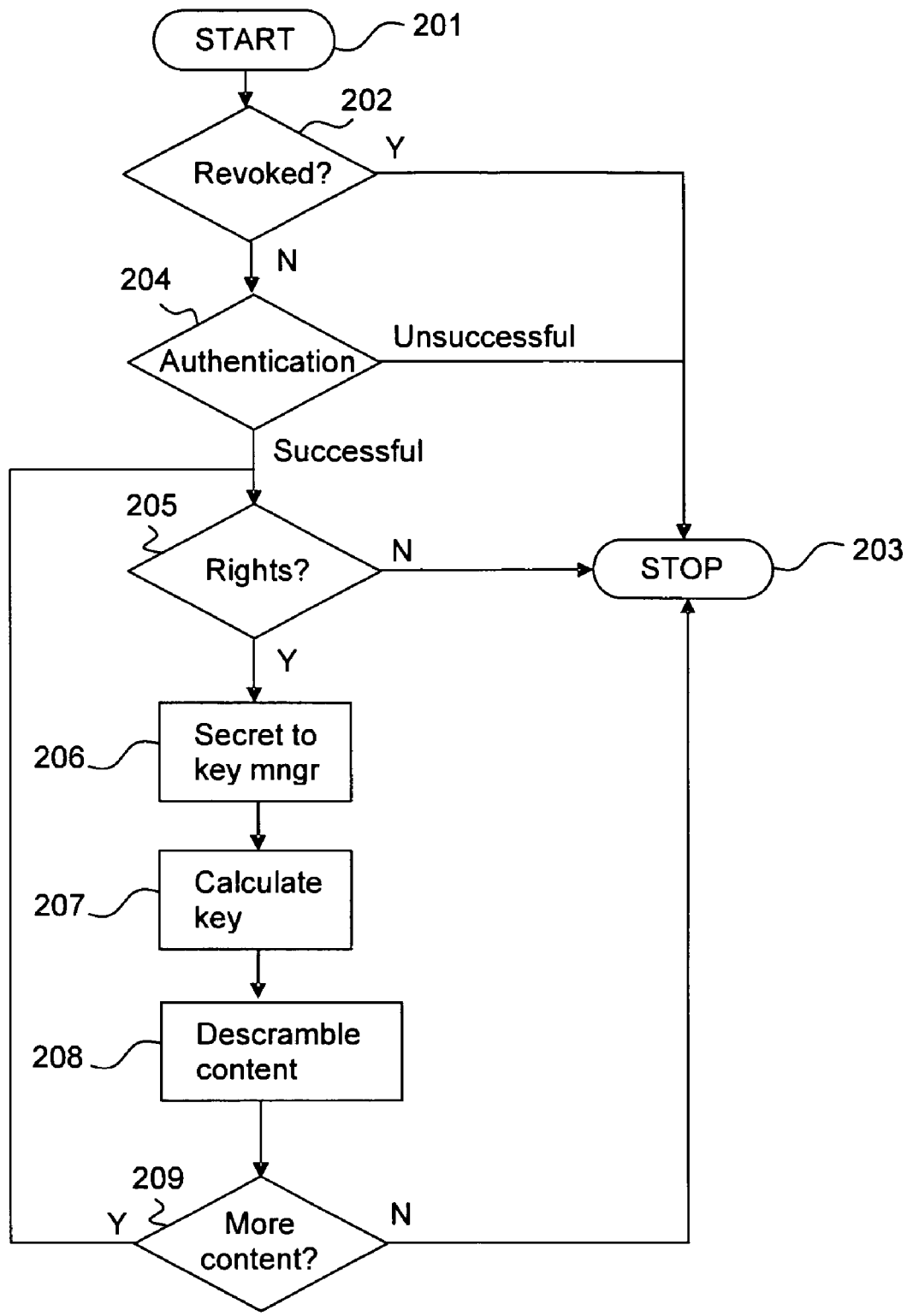
FIG. 2 illustrates the method of medium access according to the invention.

FIG. 2 illustrates the method of medium access according to the invention. When the medium 110 is to be read by the player 120, usually when the user has inserted the medium into the player and has pressed "play" or similar, the method starts at step 201 "START".

In step 202 "Revoked?", the secure processor 111 verifies if the player 120 has been revoked. This is for example done by comparing the player's identity against a revocation list 113 in the memory of the secure processor. If the player has been revoked, "Y", then the secure processor 111 aborts the method, step 203 "STOP", and refuses to communicate with the player 120. This means that authenticated media can only be played on players that have not been revoked.

However, if the player has not been revoked, the method continues.

The authenticator 122 of the player 120 and the secure processor 111 then mutually authenticate one another in step 204 "Authentication".

If the authenticator 122 fails to authenticate the medium 110, "Unsuccessful", then the player 120 aborts the method, stops in step 203, and refuses to play the medium 110. Thus, the player only plays media from authenticated suppliers, which to a certain extent counters organised piracy.

If, on the other hand, the secure processor 111 fails to authenticate the player 120, "Unsuccessful", then it aborts the method, proceeds to step 203, and refuses to communicate with the player 120. Thus, it is to a certain degree assured that authenticated media only plays on authenticated players.

Upon successful, mutual authentication, "Successful", the methods moves on to step 205 "Rights?" The secure processor 111 verifies that the player 120 has the rights necessary to play the content 114. In many cases, this is automatically true (in which case this step is superfluous), but there are cases in which further restrictions—e.g. to certain players only, to certain parts of the content 114 only, limitations as to the number of times a media can be played—are desired. The secure processor 111 may for instance verify that it has the identity of the player 120 stored in its memory. If the secure processor 111 finds that the player does not have the proper rights, then it aborts the method, proceeds to step 203, and refuses to communicate with the player 120. However, if the player 120 does have the requisite rights, then the methods continues in step 206.

Once it has been decided that the medium 110 may deliver the content 114 to the player 120, the secure processor 111 sends the information necessary for decrypting the content 114 to the key manager 123 via the interface module 121; step 206 "Secret to key mngr". The information may for example be the type of decryption key needed or the decryption key itself, although this is in no way a complete enumeration. The information may correspond to the entire content 114 or a part of the content 114, such as the section that is, or that is to be, played. The transfer of information is preferably secured by the use of encryption.

In step 207 "Calculate key", the key manager 123 uses the received information to calculate the decryption key and passes it to the descrambler 124.

In step 208 "Descramble content", the interface module 121 reads encrypted content 114 from the content memory 112 and forwards it to the descrambler 124, continuing until it runs out of content for which it has a decryption key. The descrambler 124 decrypts the content, using the decryption key received from the key manager 123, and forwards the decrypted content to a content sink 125, for example a digital bus, that uses the content.

In step 209 "More content?" it is verified if there is more content to play. If this is not the case "N", then the method stops in step 203. However, if there is more content "Y", the method continues in step 205 "Rights?" to verify that the player has the requisite rights for the upcoming content, as described hereinbefore. In an alternative embodiment, the method continues directly in step 206 "Secret key to key mngr" without verification of rights. In both embodiments, this is performed at an appropriate time so that the descrambler 124 is always in possession of the key or keys it needs to decrypt the content, providing, of course, that the player has the requisite rights.

In a particularly preferred embodiment, the secure processor 111 of the medium 110 is a radio frequency (RF) chip that does not need a battery, does not need to be in physical contact with the player 120, and that can be read even if for example covered in reasonable amounts of dirt. The interface module 121 comprises a radio frequency interface that emits a low frequency radio wave field to power the secure processor 111 and also comprises a traditional optical reader to read the content 114 stored in the content memory 112.

Furthermore in the particularly preferred embodiment, the content memory 112 stores scrambled content 114 organised in chapters (such as for examples songs and scenes), where each chapter i is scrambled with AES using key $K_i$. The secure processor 111 stores a unique public/private key pair signed by a first certification authority A, the public key of a second certification authority B, the revocation list 113, and a title key TK. The authenticator 122 stores a unique public/private key pair signed by the second certification authority B, and the public key of the first certification authority A.

Still in the particularly preferred embodiment, in step 202 "Revoked?" the secure processor 111 verifies that the certificate of the public key of the authenticator 122 is not found in the revocation list 113. Step 204 "Authentication" is performed by using the respective public/private key pairs. The secure processor 111 and the authenticator 122 establish a secure authenticated channel using, for example, an authenticated Diffie-Hellman key exchange that creates a shared session key $K_{sess}$. As for step 205 "Rights?", ownership of the medium 110 confers permanent rights.

Figure 3:
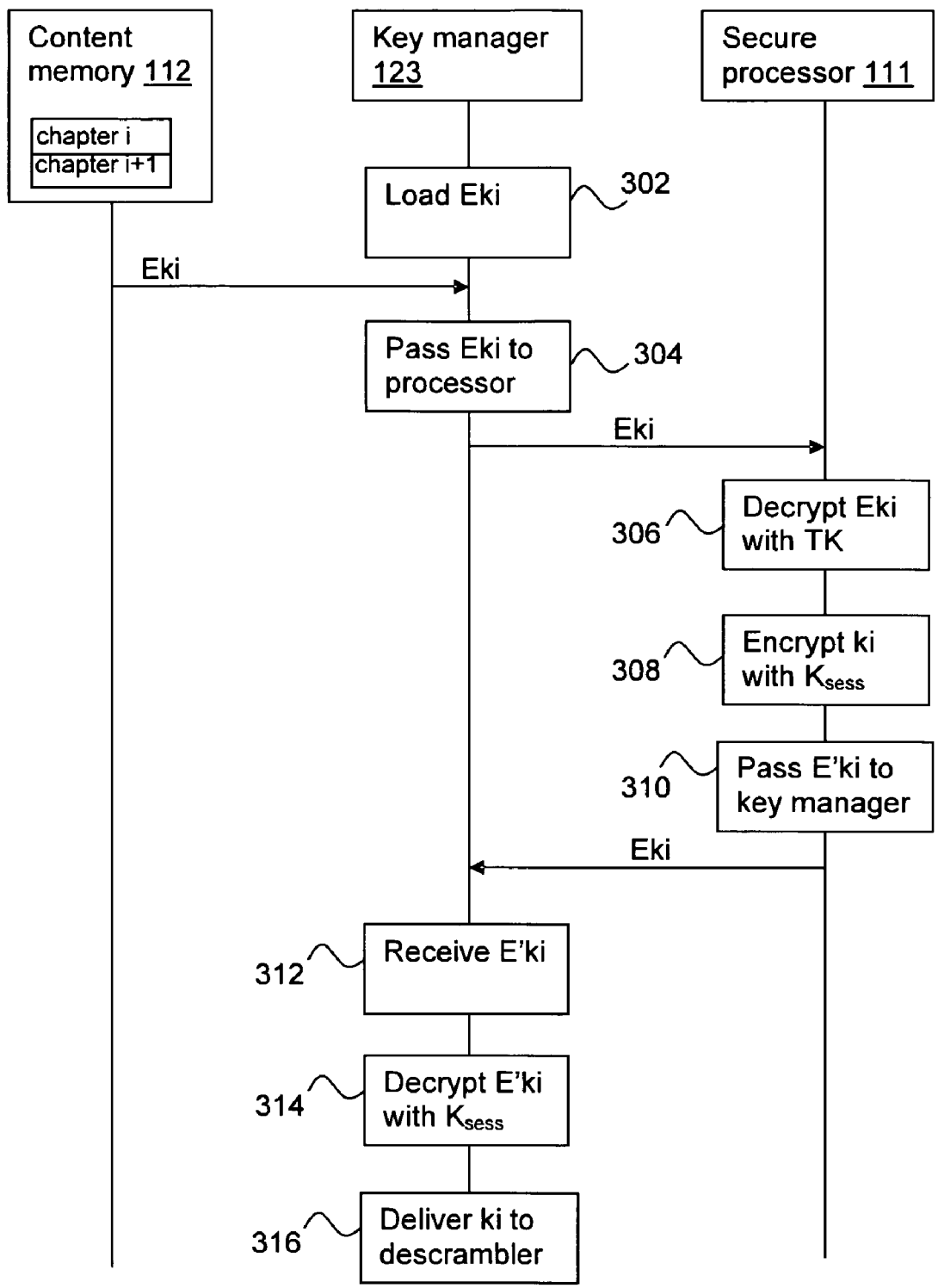
FIG. 3 illustrates the delivery of the necessary descrambling key.

FIG. 3 illustrates the delivery of the necessary descrambling key. In step 206, when starting a new chapter i, the key manager 123 loads, step 302, the first encrypted descrambling key Eki and passes it, step 304, to the secure processor 111 that decrypts the descrambling key using the title key TK, step 306, and re-encrypts it with AES using the session key $K_{sess}$, step 308. The secure processor 111 then passes the re-encrypted descrambling key to the key manager 123, step 310, that receives the descrambling key, step 312, decrypts it with AES using the session key $K_{sess}$, step 314, and feeds the decrypted descrambling key to the descrambler chip 124, step 316.

It will be understood that the present invention has been described purely by way of example, and modifications of detail can be made without departing from the scope of the invention.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

What is claimed is:

1. In a player, method of descrambling encrypted content stored on a secure pre-recorded medium, the player being able to communicate with the secure pre-recorded medium, comprising the steps of:
    accessing, by the player, the secure pre-recorded medium, which is communicatively coupled to, and readable by, the player, the secure pre-recorded medium having a secure processor and encrypted content thereon, the secure medium having one or more secret keys for descrambling the encrypted content;
    authenticating, by the player, the secure processor;
    reading, by the player, an encrypted version of the secret descrambling key encrypted using a first key from a content memory on the secure pre-recorded medium;
    sending, by the player, the encrypted descrambling key encrypted using the first key to the secure processor;
    receiving, by the player, from the secure processor the secret descrambling key encrypted using a session key;
    decrypting, by the player, the secret descrambling key using the session key;
    receiving, by the player, from the secure pre-recorded medium, the encrypted content; and
    descrambling, by the player, the encrypted content with the secret descrambling key.

2. The method of claim 1, wherein the authenticating step further comprises the step of creating a session key shared by the player and the secure processor.

3. The method of claim 1, wherein the authenticating step is performed before the receiving step.

4. The method of claim 1, wherein said authenticating step includes creating the session key.

* * * * *